US005761375A

United States Patent [19]
Naito

[11] Patent Number: 5,761,375
[45] Date of Patent: Jun. 2, 1998

[54] BRUSHLESS MOTOR SPEED DETECTION DEVICE

[75] Inventor: Hayato Naito, Nagano, Japan

[73] Assignee: Kabushiki Kaisha Sankyo Seiki Seisakusho, Nagano, Japan

[21] Appl. No.: 663,453

[22] Filed: Jun. 13, 1996

[30] Foreign Application Priority Data

Aug. 10, 1995  [JP]  Japan .................................. 7-225925

[51] Int. Cl.$^6$ ........................................................ G05F 1/10
[52] U.S. Cl. ........................... 388/806; 318/798–815; 318/632; 318/727; 388/815; 388/928.1
[58] Field of Search ................................... 318/798–815, 318/632, 727; 388/806, 815, 928.1

[56] References Cited

U.S. PATENT DOCUMENTS 5,332,955  7/1994  Hopper ................................. 318/632

FOREIGN PATENT DOCUMENTS 746879  2/1995  Japan ................................. H02P 6/16

*Primary Examiner*—Karen Masih
*Attorney, Agent, or Firm*—Sughrue, Mion, Zinn, Macpeak & Seas, PLLC

[57] ABSTRACT

A delay signal rising after the passage of a predetermined time from the rising or falling of a position signal is formed by means of a delay circuit. While an offset circuit is used for sequentially monitoring the size relation between an induced electromotive voltage and a coil neutral point voltage, an offset is applied to the induced electromotive voltage when a regular speed detection signal is output from a comparator at the time the induced electromotive voltage and the coil neutral point voltage cross each other so as to raise the induced electromotive voltage up to the vicinity of a supply voltage Vcc or otherwise lower the induced electromotive voltage up to the vicinity of the ground potential. The inversion of the compared input voltage subjected to the waveform disturbance produced in the induced electromotive voltage due to the switching of energizing driving coils, speed error correction and the like is thus prevented and the offset signal is canceled after waveform disturbances are overlooked according to the delay signal and prior to the detection of the next speed detection signal.

7 Claims, 9 Drawing Sheets

(ENLARGED)

BRUSHLESS MOTOR SPEED DETECTION DEVICE

BACKGROUND OF THE INVENTION

1. Field of Industrial Application

The present invention relates to a brushless motor speed detection device.

2. Related Art

Figure 12:
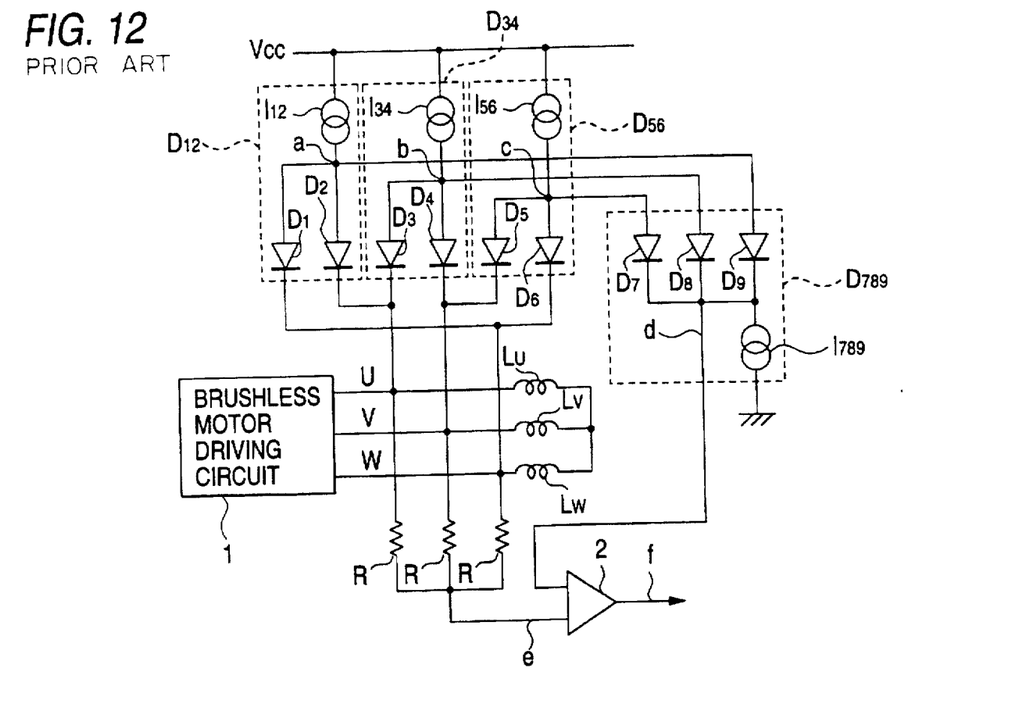
FIG. 12 is a block diagram illustrating a conventional brushless motor speed detection device.

There have been proposed various ideas as to brushless motors in which a speed detection signal is obtained without using a special sensor such as a frequency generator (FG), an encoder or the like, and Japanese Patent Laid-Open No. 46879/1995, for example, discloses a speed detection device for the purpose. FIG. 12 shows a brushless motor speed detection device according to Japanese Patent Laid-open No. 46879/1995.

In the aforesaid brushless motor, a three-phase sine wave signal corresponding to the position of a rotor (not shown) with respect to a stator having driving coils Lu, Lv, Lw is supplied from Hall elements (not shown) to a brushless motor driving circuit 1 and a driving current is supplied from the brushless motor driving circuit 1 to the driving coils Lu, Lv, Lw, so that the rotor is caused to rotate.

Voltage signals U (as shown by a solid line), V (dotted line) and W (chain line) that have been generated then in the respective driving coils Lu, Lv, Lw are input to a two-input diode OR circuit D12 having diodes D1, D2 and a current source I12, a two-input diode OR circuit D34 having diodes D3, D4 and a current source I34, and a two-input diode OR circuit D56 having diodes D5, D6 and a current source I56, respectively. In this case, only a potentially low waveform out of each set of two-input waveforms (U-, W-phase; U-, V-phase; V-, W-phase) is output from the two-input diode OR circuits D12, D34, D56 to a three-input diode OR circuit D789 having diodes D7, D8, D9 and a current source I789. In other words, the waveform shown by a of FIG. 13 is output from the two-input diode OR circuit D12; the waveform shown by b of FIG. 13 from the two-input diode OR circuit D34; and the waveform shown by c of FIG. 13 from the two-input diode OR circuit D56.

Figure 13:
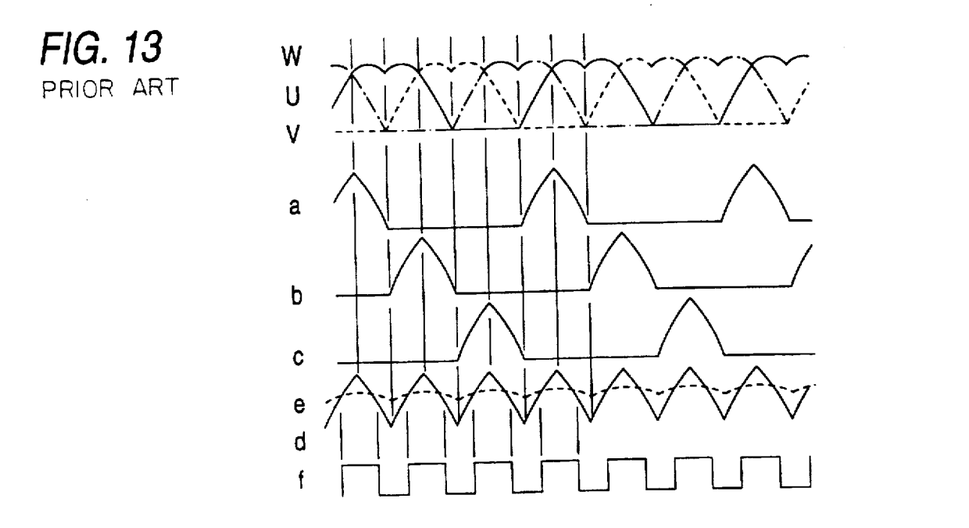
FIG. 13 is a timing chart explanatory of the operation of the circuit of FIG. 12.

The three-phase signals from these two-input diode OR circuits D12, D34, D56 are input to the three-input diode OR circuit D789, whereas only the potentially highest waveform out of the three input waveforms shown by a, b, c of FIG. 13 is supplied from the three-input diode OR circuit D789 to one input terminal of a comparator 2; that is, a triangular wave signal (induced electromotive voltage) as shown by d of FIG. 13 is output from the three-input diode OR circuit D789.

The triangular wave signal (induced electromotive voltage) from the three-input diode OR circuit D789 and a coil neutral point voltage obtained from star connection resistors R, R, R as shown by e of FIG. 13 are input to and compared by the comparator 2 and then a speed detection signal as shown by f of FIG. 13 is output from the comparator 2.

Thus the motor speed is kept constant by inputting the speed detection signal f to a motor speed control circuit (not shown) and regulating the control input of the brushless motor driving circuit 1, so that a speed detection signal f greater than the number of driving magnetic poles of a motor (e.g., a 24-pulse FG in the case of a motor having 16 magnetic poles) is obtainable with a simple circuit configuration.

Incidentally, Vcc in FIG. 12 represents a supply voltage and alphabets showing the waveforms in FIG. 13 each correspond to those indicative of the points shown in FIG. 12.

Figure 14:
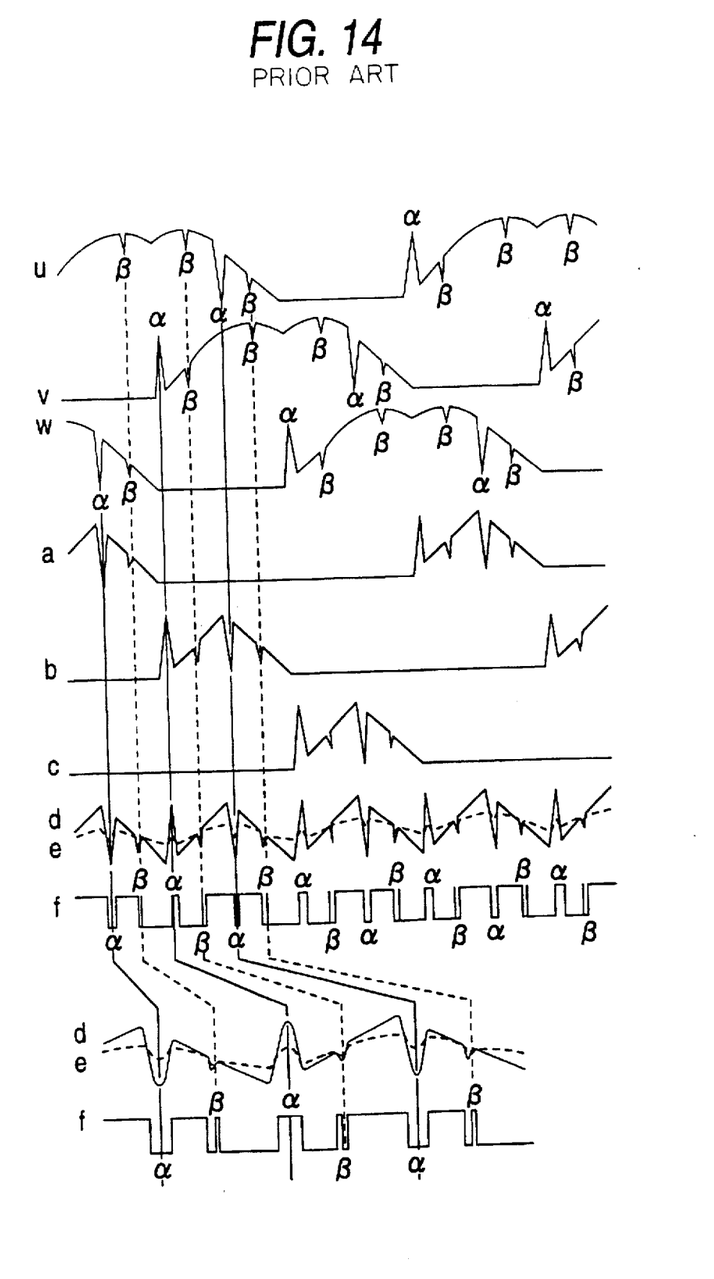
FIG. 14 is a timing chart for depicting problems posed on the device of FIG. 12.

In the case of the aforementioned brushless motor speed detection device, the coil voltage waveforms actually appear as shown by U, V, W of FIG. 14 because the switching of energizing the driving coils Lu, Lv, Lw, speed error correction and the like cause the coil current to sharply change. More specifically, the switching of energizing the driving coils Lu, Lv, Lw and the speed error correction cause disturbances α, β in the coil voltage waveforms U, V, W.

When such disturbances α, β are generated in the coil voltage waveforms U, V, W, the disturbances α, β are directly inherited by the output waveform a from the two-input diode OR circuit D12, the output waveform b from the two-input diode OR circuit D34, the output waveform c from the two-input diode OR circuit D56 and the output waveform (induced electromotive voltage) d from the three-input diode OR circuit D789. When the disturbances α, β are thus generated in the induced electromotive voltage, the inversion of the input comparison voltage of the comparator 2 are caused because of the disturbances α, β and a mispulse is generated in the speed detection signal f accordingly because of the disturbances α, β.

Therefore, it is absolutely impossible to effect normal speed control with the speed detection signal f and the problem is that reliability is reduced.

SUMMARY OF THE INVENTION

An object of the present invention is to provided a brushless motor speed detection device wherein a speed detection signal is obtained without using a special sensor such as a frequency generator (FG), an encoder or the like and wherein no mispulse resulting from the switching of energizing driving coils, speed error correction and the like is generated in the speed detection signal using an induced electromotive voltage, whereby reliability is improved under precise motor speed control.

According to the present invention there is provided a brushless motor speed detection device that includes (i) a stator having a three-phase driving coil reciprocally energized in positive and negative directions, (ii) a rotor with magnetic poles, and (iii) position detecting means for providing a three-phase output signal corresponding to the rotation of the rotor with respect to the stator. A brushless motor driving circuit controls energization of the driving coil in accordance with the output signal of the position detecting means. A first synthesizing circuit is connected to the driving coils for providing an induced electromotive voltage based on the voltage waveform generated at each driving coil end. Coil neutral point detecting means are connected to the driving coils for detecting and providing a neutral point voltage of the driving coils. A second synthesizing circuit is connected to the positioning detecting means for synthesizing the output signal of the position detecting means into a position signal. A delay circuit is connected to the second synthesizing circuit for providing a delay signal having a phase which rises and falls later than the respective rising and falling timing of the position signal provided by the second synthesizing circuit. An offset circuit is provided for comparing the induced electromotive voltage with the coil neutral point voltage while applying an offset to the induced electromotive voltage and canceling the offset in accordance with the delay signal. A speed detection signal is generated by a comparator which compares the induced electromotive voltage with the coil neutral point voltage.

As set forth above, a highly accurate speed detection signal is obtainable by preventing the occurrence of such a mispulse as is caused by the switching of energizing the

3 driving coils, the speed error correction and the like. Thus excellent speed control can be exerted over a motor.

DETAILED DESCRIPTION OF THE PREFERRED EMBODIMENTS

Figure 1:
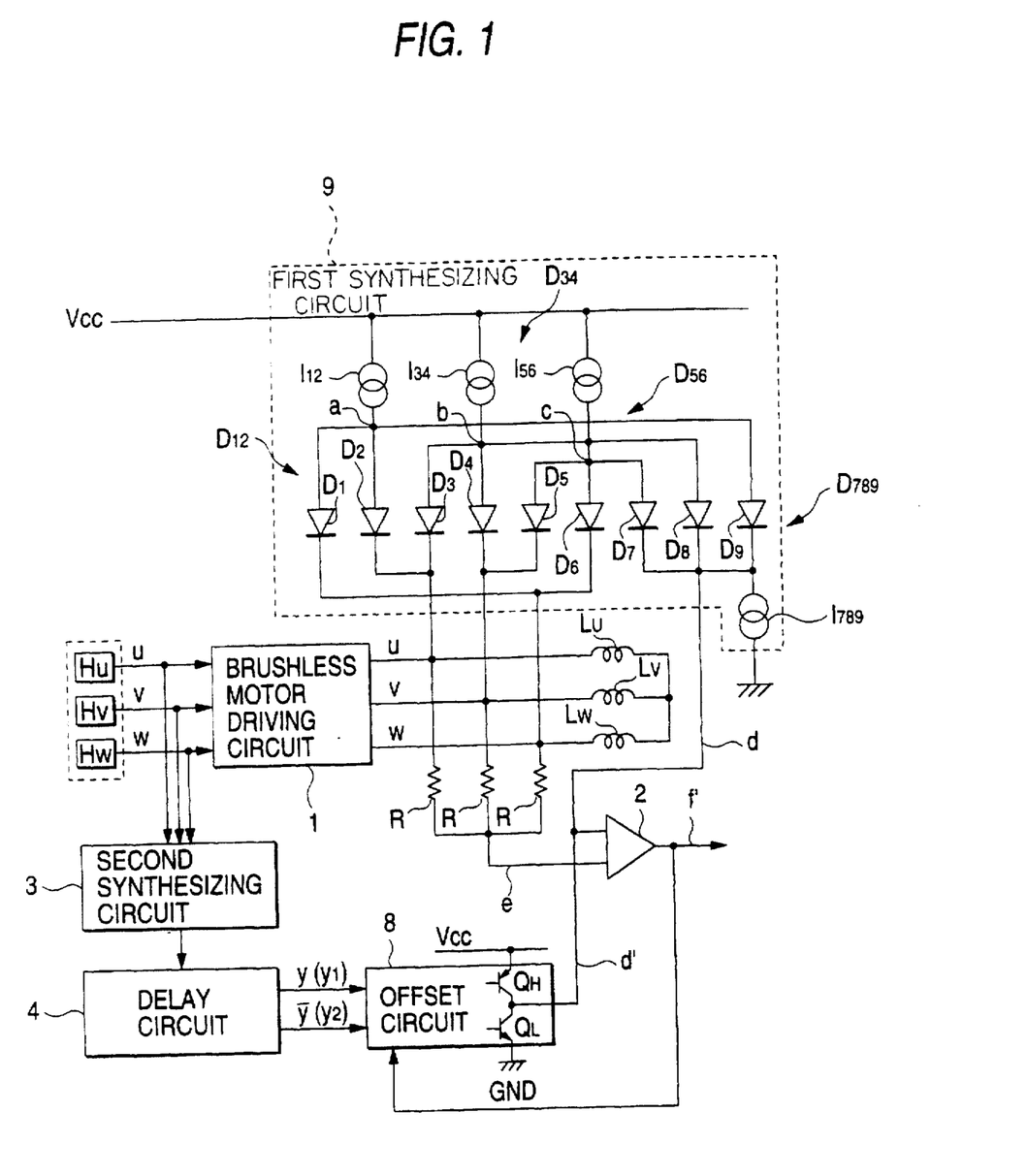
FIG. 1 is a block diagram illustrating a brushless motor speed detection device embodying the present invention.

Referring to the accompanying drawings, there will be given a description of an embodiment of the present invention. FIG. 1 is a block diagram of a brushless motor speed detection device embodying the present invention and FIG. 2 a schematic exploded perspective view of the brushless motor, wherein like reference characters designate like component parts referred to in the description of the prior art.

Figure 2:
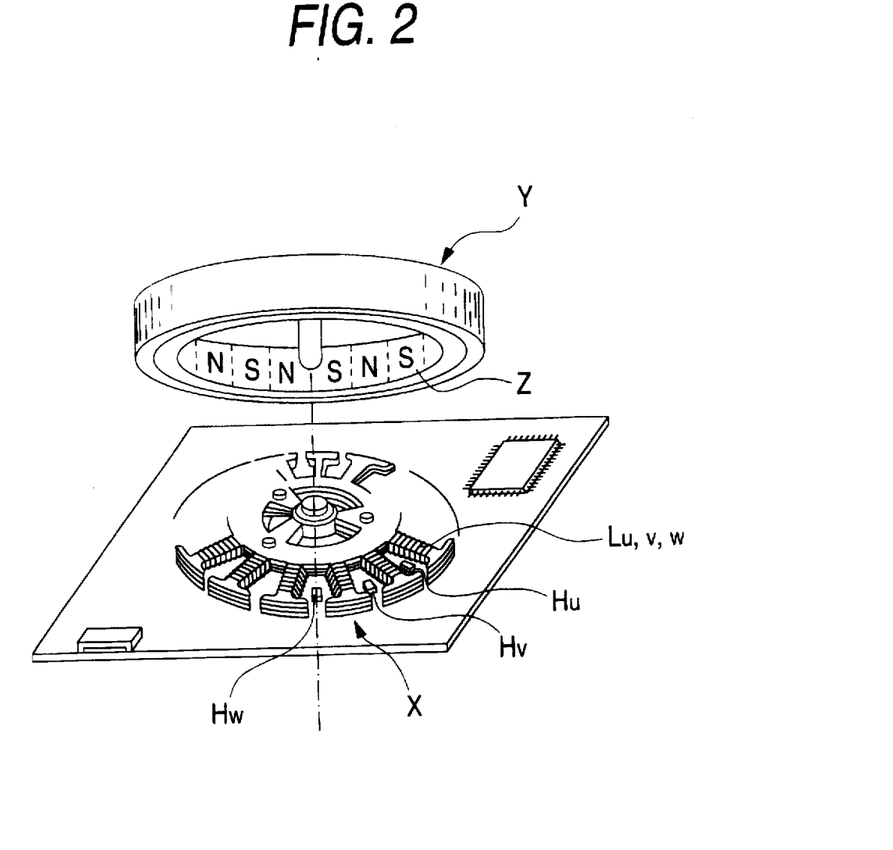
FIG. 2 is a schematic perspective view showing the construction of the brushless motor speed detection device according to the present invention.

The brushless motor is provided with a stator X having driving coils Lu, Lv, Lw, a rotor Y having magnetic poles Z and position detecting means or Hall elements Hu, Hv, Hw, for example, for use in obtaining a three-phase output signal corresponding to the rotation of the rotor Y with respect to the stator X. A rotor Y is rotated when a driving current is supplied from a brushless motor driving circuit 1 to the driving coils Lu, Lv, Lw in accordance with the outputs of the Hall elements Hu, Hv, Hw.

As shown in FIG. 1, a first synthesizing circuit (induced electromotive voltage synthesizing circuit) 9 for obtaining an induced electromotive voltage based on the voltage waveform generated at each driving coil end is connected to the driving coils Lu, Lv, Lw. As the configuration of the first synthesizing circuit 9 is similar to what is shown in FIG. 12, the description thereof will be omitted.

4

The output terminal of the first synthesizing circuit 9, that is, the cathode common of a three-input diode OR circuit D789 having diodes D7, D8, D9 and a current source I789 is connected to one input terminal of a comparator 2. On the other hand, resistors R, R, R are connected in the form of a star to the output terminals of the driving coils Lu, Lv, Lw so that a coil neutral point voltage (virtual coil neutral point voltage, to be exact) may be output. Further, the common terminal of these resistors R, R, R is connected to the other input terminal of the comparator 2.

In addition to the driving circuit 1, a second synthesizing circuit (position signal synthesizing circuit) 3 for synthesizing the output signals of the Hall elements Hu, Hv, Hw into a position signal is connected to the Hall elements Hu, Hv, Hw. Further, a delay circuit 4 is connected to the second synthesizing circuit 3 and used for forming not only a first delay signal which rises after the passage of a predetermined time t from the rising timing of the position signal and falls after the passage of the predetermined time t from the falling timing thereof but also a second delay signal as an inverted signal of the first one.

An offset circuit 8 is connected to the delay circuit 4 and the output terminal of the comparator 2 is connected to the offset circuit 8 and to the output terminal of the offset circuit 8, the output terminal of the first synthesizing circuit 9 is connected. While comparing the induced electromotive voltage synthesized in the first synthesizing circuit 9 with the coil neutral point voltage from the resistors R, R, R connected in the form of a star, the offset circuit 8 applies a full offset so as to raise the induced electromotive voltage up to the vicinity of a supply voltage Vcc when the induced electromotive voltage becomes higher than the coil neutral point voltage, cancels the full offset when the first delay signal reaches a Hi level (high level) on the basis of the first delay signal, applies the full offset so as to lower the induced electromotive voltage up to the vicinity of the ground potential (GND) when the induced electromotive voltage becomes lower than the coil neutral point voltage, and cancels the full offset when the second delay signal reaches the Hi level (high level) on the basis of the second delay signal. Then a speed detection signal f is output from the comparator 2 for comparing an induced electromotive voltage d' subjected by the offset circuit 8 to waveform shaping with a neutral point voltage e.

Figure 3:
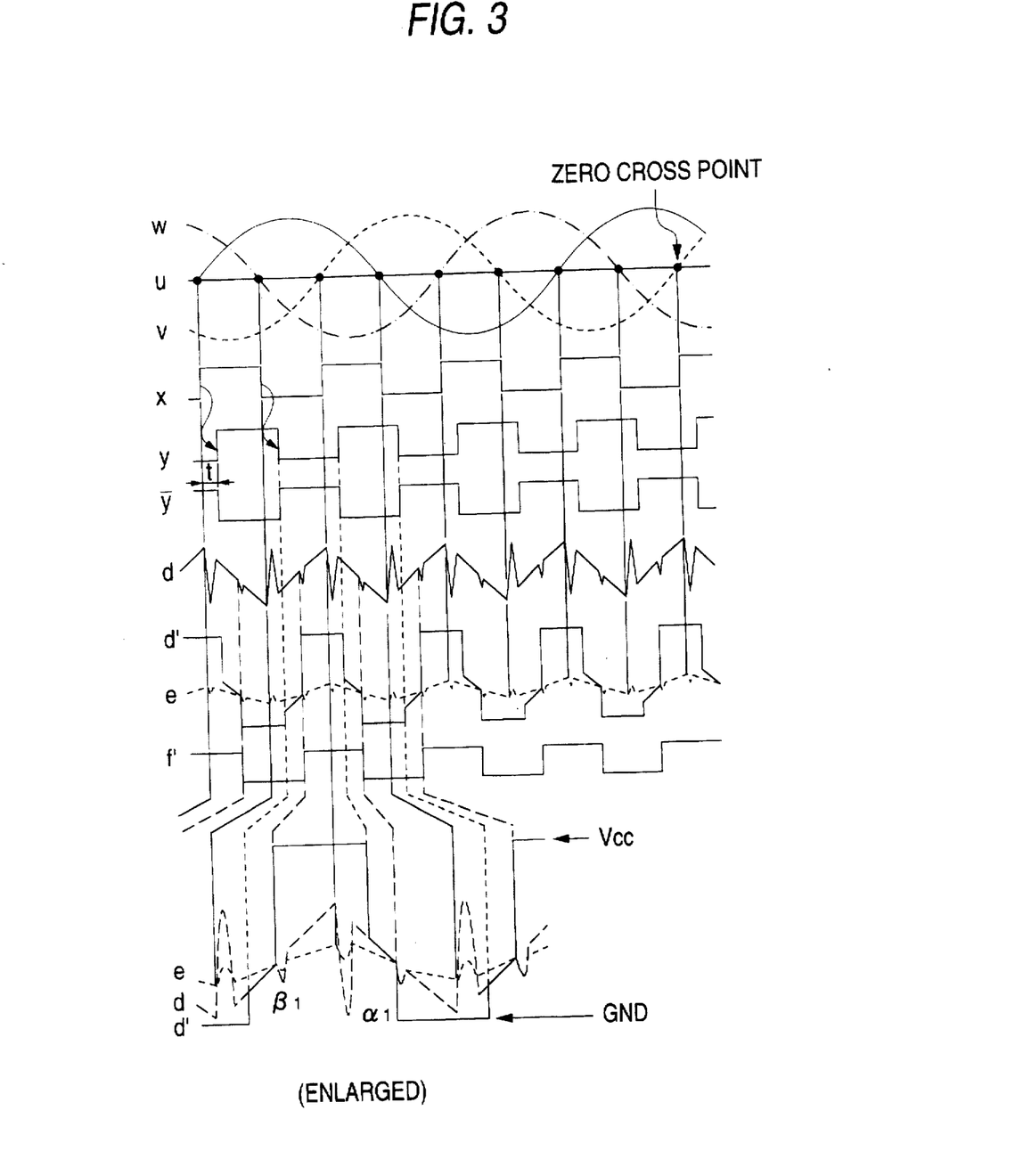
FIG. 3 is a timing chart explanatory of the operation of the circuit of FIG. 1.

A description will subsequently be given of the operation of the device thus arranged. When the Hall elements Hu, Hv, Hw detect the magnetic field of a driving magnet having magnetic poles Z, waveforms u, v, w of FIG. 3 are output from the Hall elements Hu, Hv, Hw. This three-phase sine wave signal is input to the driving circuit 1, which applies driving currents Iu, Iv, Iw to the driving coils Lu, Lv, Lw, whereby voltage signals as shown by U, V, W of FIG. 14 are generated in the driving coils Lu, Lv, Lw.

Each of the U-, V-, W-phase signals is input to the first synthesizing circuit 9 and an induced electromotive voltage (a triangular wave signal) containing a disturbance α due to the switching of energizing the driving coils Lu, Lv, Lw and a disturbance β resulting from speed error correction is output from the first synthesizing circuit 9 as shown in FIG. 3d (see the description of the prior art for detail). Then the induced electromotive voltage d and the coil neutral point voltage e are input to the comparator 2 for comparison.

Figure 6:
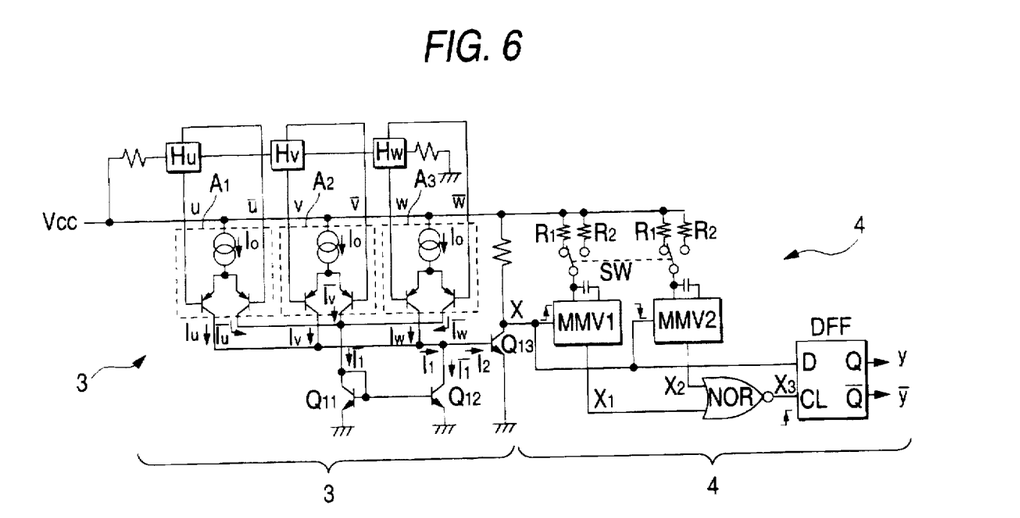
FIG. 6 is a circuit diagram illustrating a specific configuration of the second synthesizing circuit and the delay circuit of FIG. 1.

On the other hand, the three-phase sine wave signals u, v, w of FIG. 3 are input to the second synthesizing circuit 3 in which a position signal x is formed before being input to the delay circuit 4. Then a first and a second delay signal y1, y2 are obtained in the delay circuit 4. FIG. 6 shows specific configurations of the second synthesizing circuit 3 and the delay circuit 4, and a timing chart of them.

As shown in FIG. 6, the second synthesizing circuit 3 makes its Hall amplifiers A1, A2, A3 receive the output signals of the respective Hall elements Hu, Hv, Hw, causes the identical-polarity output currents of the Hall amplifiers A1, A2, A3 to flow together, allows one polarity side to flow through a current mirror Q11 and the other polarity side to flow through a current mirror Q12, so that a transistor Q13 is turned on/off in agreement with a current difference obtainable from the current mirrors Q11, Q12.

Figure 7:
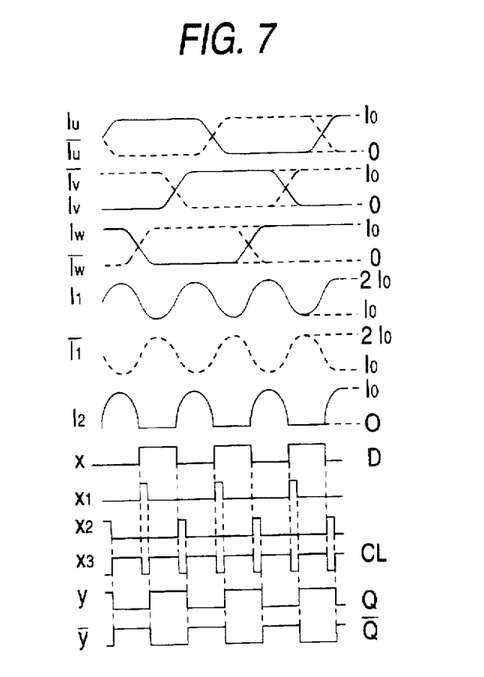
FIG. 7 is a timing chart explanatory of the operation of the circuit of FIG. 6.

More specifically, the output u and inverted output u ($\bar{u}$), output v and inverted output v ($\bar{v}$), and output w and inverted output w ($\bar{w}$) of the Hall elements Hu, Hv, Hw are input to the Hall amplifiers A1, A2, A3, respectively. Further, the current Iu and inverted current Iu ($\bar{Iu}$), current Iv and inverted current Iv ($\bar{Iv}$) and current Iw and inverted current Iw (Iw) shown in FIG. 7 are output from the Hall amplifiers A1, A2, A3, respectively. Then the output currents Iu, Iv, Iw of the Hall amplifiers are joined together into a flow I1, whereas the inverted currents Iu, Iv, Iw ($\bar{Iu}$, $\bar{Iv}$, $\bar{Iw}$) thereof are jointed together into an inverted flow I1 ($\bar{I1}$).

The inverted current I1 ($\bar{I1}$) is joined via the current mirrors Q11, Q12 to I1 and changed to the base current I2 of the transistor Q13. In this case, I2 exclusively flows into the transistor Q13 and when inverted I1 ($\bar{I1}$)>I1, it is turned to 0 (see FIG. 7).

When I2 thus flows, the transistor Q13 is turned on, so that the output signal (position signal x) is set at Lo level (low level). When I2 does not flow, on the other hand, the transistor Q13 is turned off, so that the position signal x is set at Hi level (high level). Therefore, the position signal shown by x of FIGS. 3 and 7 is output from the second synthesizing circuit 3.

The delay circuit 4 is provided with monostable multivibrators MMV1, MMV2 connected to the collector of the transistor Q13, a NOR circuit NOR connected to the outputs of the monostable multivibrators MMV1, MMV2, and a D-type flip-flop DFF connected to the output terminal of the NOR circuit NOR and the collector of the transistor Q13.

In other words, the monostable multivibrator MMV1 outputs a pulse signal x1 of a constant width by means of a CR time constant with the rise of the position signal x as a trigger, whereas the monostable multivibrator MMV2 outputs a pulse signal x2 of a constant width by means of the CR time constant with the fall of the position signal x as a trigger.

The pulse signals x1, x2 are input to and synthesized in the NOR circuit NOR, and a pulse signal x3 is output from the NOR circuit NOR. The pulse signal x3 and the position signal x are input to the D-type flip-flop DFF. The D-type flip-flop DFF operates at the rise of the pulse signal x3 applied to a clock (CL) terminal and outputs the state (Hi, Lo) of the position signal x applied to a data (D) terminal from a terminal Q then. Further, the inverted signal of the terminal Q is output from an inverted terminal $\bar{Q}$. The output Q and the inverted output $\bar{Q}$ of the D-type flip-flop DFF respectively become a full-offset cancel signal y(y1) and an inverted full-offset cancel signal y(y2), which will be described later.

In other words, a first and a second delay signal as shown by y, inverted y ($\bar{y}$) of FIGS. 3 and 7 are output from the delay circuit 4, respectively. As shown in FIGS. 3 and 7, the first delay signal rises after the passage of the predetermined time t from the rising timing of the position signal x and falls after the passage of the predetermined time t from the falling timing thereof, whereas the second delay signal falls after the passage of the predetermined time t from the rising timing of the position signal x and rises after the passage of the predetermined time t from the falling timing thereof.

The full-offset cancel signal y(y1), the full-offset cancel signal $\bar{y}$(y2) and the output f' of the comparator 2 are input to the offset circuit 8 and an output signal d' from the offset circuit 8 is input to one input terminal of the comparator 2.

When the induced electromotive voltage d becomes higher than the coil neutral point voltage e, the output f' of the comparator 2 is turned to the Hi level (high level) as shown in FIG. 3 and a transistor $Q_H$ of the offset circuit 8 is turned on, whereby the full offset is applied so that the output voltage d' is raised up to the vicinity of the supply voltage Vcc.

When the first delay signal y from the delay circuit 4 is turned to the Hi level (High level) then, the transistor $Q_H$ is turned off and as shown in FIG. 2, the full offset of the output voltage d' is canceled and the output voltage d' becomes the induced electromotive voltage d.

When the induced electromotive voltage d becomes lower than the coil neutral point voltage e, the output f' of the comparator 2 is turned to the Lo level (low level) as shown in FIG. 3 and a transistor $Q_L$ is turned on as shown in FIG. 1, whereby the full offset is applied so that the output voltage d' is lowered up to the vicinity of the ground potential (GND).

When the second delay signal (inverted y) from the delay circuit 4 is turned to the Hi level (high level), the transistor QL is turned off and as shown in FIG. 3, the full offset of the output voltage d' is canceled and the output voltage d' becomes the induced electromotive voltage d.

Figure 4:
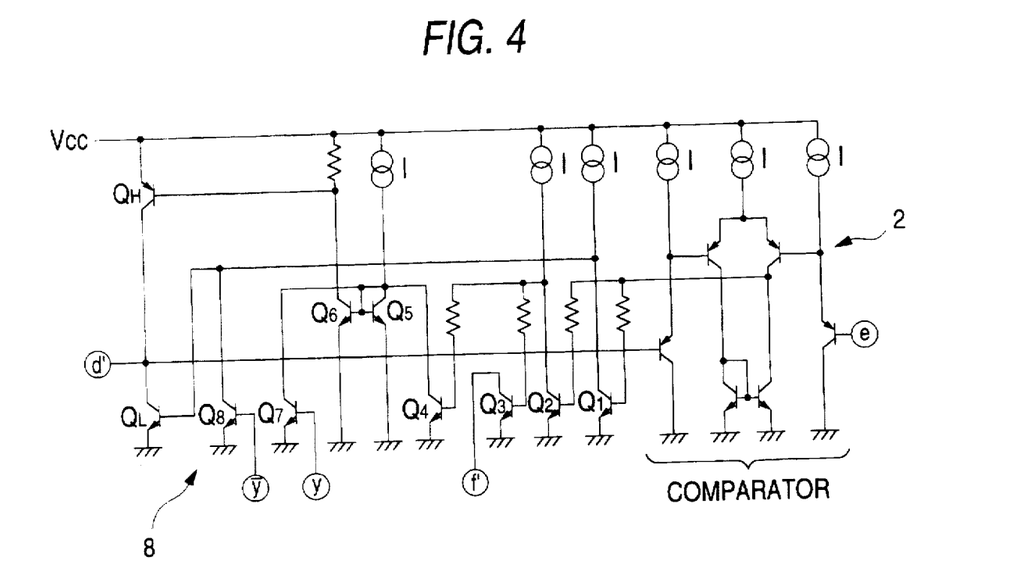
FIG. 4 is a circuit diagram illustrating a specific configuration of the offset circuit and the comparator of FIG. 1.
Figure 5:
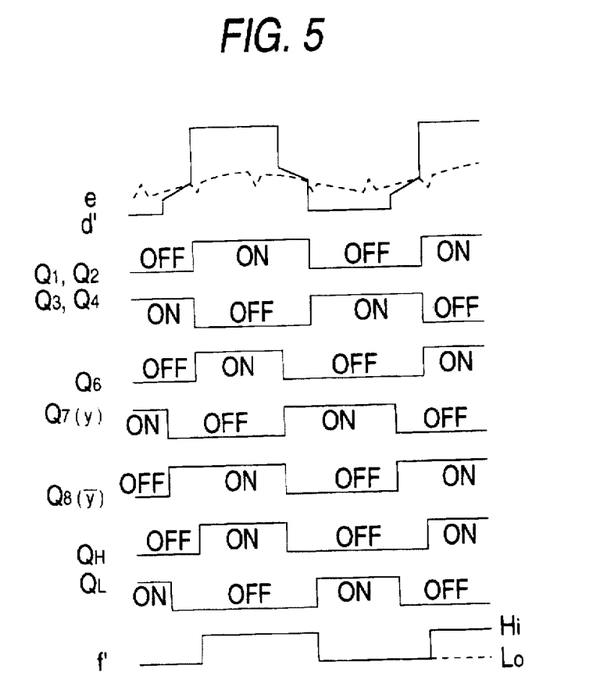
FIG. 5 is a timing chart explanatory of the operation of the circuit of FIG. 4.

FIG. 4 shows a specific arrangement of the offset circuit 8 and the comparator 2 and FIG. 5 a timing chart.

When the output voltage d' becomes higher than the coil neutral point voltage e, the current flows through the bases of transistors Q1, Q2 of the offset circuit 8 as shown in FIG. 4 because of the operation of the comparator 2, and the transistor Q1, Q2 are turned on. When the transistor Q2 is turned on, transistor Q3, Q4 are turned off and the speed detection signal f' is turned to the Hi level (high level) as shown in FIGS. 3 and 5. In this case, the current flows through current mirrors Q5, Q6 since the transistor Q4 is held OFF and the transistor $Q_H$ is turned on; that is, the full offset on the supply voltage Vcc side is applied.

When the full offset cancel signal (first delay signal y) is turned to the Hi level (high level) then, a transistor Q7 is turned on, so that the transistor QH is turned off.

When the output voltage d' becomes lower than the coil neutral point voltage e, the comparator 2 operates to cut the current directed to the bases of the transistors Q1, Q2, which are turned off accordingly. When the transistor Q1 is turned off, the current flows toward the base of the transistor $Q_L$, thus turning on the transistor QL. Thus the full offset on the ground supply voltage side is applied.

When the full offset cancel signal (inverted second delay signal y) is turned to the Hi level (high level) then, a transistor Q8 is turned on, so that the transistor $Q_L$ is turned off. During the time the transistor Q2 is held OFF, the transistors Q3, Q4 are turned on and the speed detection signal f' is turned to the Lo level (low level) as shown in FIGS. 3 and 5. Incidentally, the symbol I in FIG. 4 designates a current source.

As set forth above, according to this embodiment of the invention, the induced electromotive voltage d synthetically formed by the first synthesizing circuit 9 and the coil neutral point voltage e detected by the coil neutral point voltage detecting means R. R. R cross each other and the full offset is applied to the induced electromotive voltage d immediately when the regular speed detection signal f' is output from the comparator 2 so as to raise the induced electromotive voltage d up to the vicinity of the supply voltage Vcc or lower it up to the vicinity of the ground potential GND. whereby the waveform disturbances α. β caused in the induced electromotive voltage d due to the switching of energizing the driving coils Lu. Lv. Lw. the speed error correction and the like.

Then the full offset is canceled on the basis of the delay signal before the next speed detection signal f' is detected by overlooking the disturbances α. β.

With this arrangement, it is possible to control the speed of a motor properly because a precise speed detection signal free from a mispulse is obtainable.

The speed detection device according to this embodiment of the invention is fit to be formed into an integrated circuit device and also incorporated into a brushless motor driving IC; thus the construction can be simplified.

In a case where the rated number of revolutions is changed according to this embodiment of the invention, external resistors are switched from R1 to R2 by switching the switches SW (delay time variable means) of the monostable multivibrators MMV1. MMV2 so as to vary the delay time t by switching the CR time constants. Even when the rated number of revolutions is thus changed, the offset cancel timing can be adjusted so that it is fixed prior to the detection of the next speed detection signal f' after the waveform disturbances α. β are overlooked. Therefore. the aforementioned effect is achievable even when the rated number of revolutions is changed.

Incidentally, the delay time t should preferably be set to about ¼–⅕ of the half-period of the speed detection signal as far as the rated number of revolutions of the motor is concerned.

Figure 8:
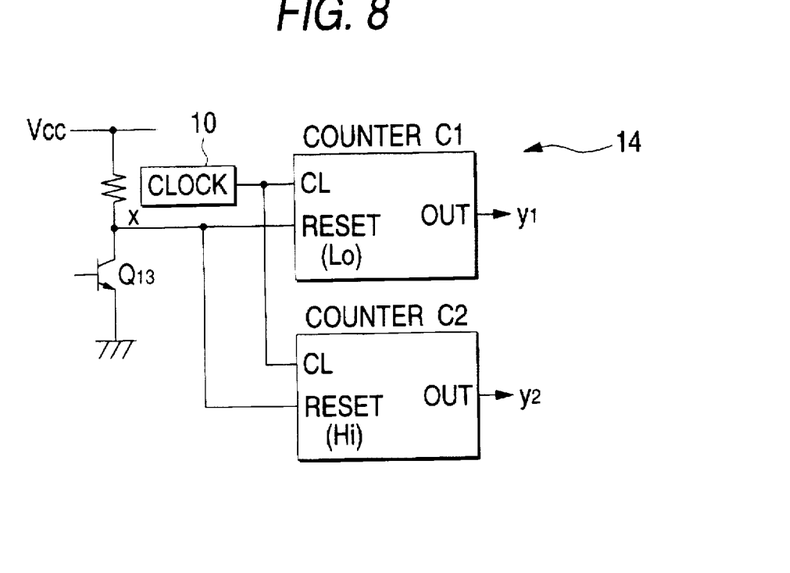
FIG. 8 is a circuit diagram illustrating another configuration of the delay circuit.
Figure 9:
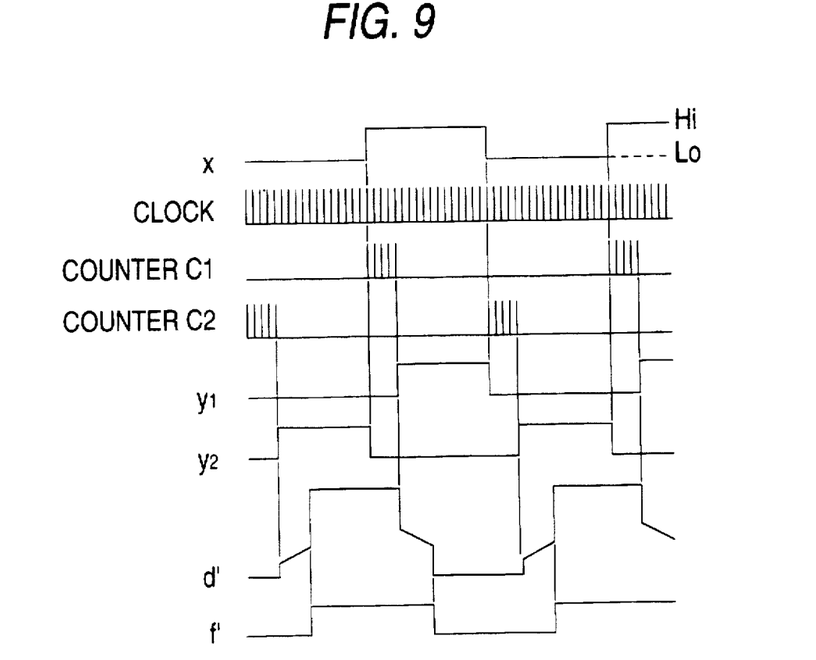
FIG. 9 is a timing chart explanatory of the operation of the circuit of FIG. 8.

FIG. 8 is a circuit diagram of another specific delay circuit and FIG. 9 a timing chart explanatory of the operation of the circuit of FIG. 8. This delay circuit 14 is provided with a counter C1 of a so-called Lo reset type and a counter C2 of a so-called Hi reset type.

The counter C1 starts counting clock signals 10 when the position signal x is turned to the Hi level (high level) and on completing counting a predetermined number of counts. sets an output (a first delay signal) y1 to the Hi level (high level), whereas it is reset when the position signal x is turned to the Lo level (low level) so as to turn the first delay signal y1 to the Lo level (low level).

On the other hand, the counter C1 starts counting clock signals 10 when the position signal x is turned to the Lo level (low level) and on completing counting a predetermined number of counts. sets an output (a second delay signal) y2 to the Hi level (high level), whereas it is reset when the position signal x is turned to the Hi level (high level) so as to turn the second delay signal y2 to the Lo level (low level).

When the first and second delay signals y1. y2 thus obtained are input to the offset circuit 8 as full offset cancel signals, the falling timing is quickened in comparison with the aforementioned first and second delay signal y and inverted signal ȳ as shown in FIG. 9. Consequently, signals d'. f' similar to those obtained according to the preceding embodiment of the invention without badly affecting the operation of canceling the full offset.

Therefore, the same effect is achievable even though the delay circuit 4 is replaced with this delay circuit 14.

When the rated number of revolutions is switched as it is changed, it is possible to adjust the offset cancel timing in such a way that the timing is fixed prior to the detection of the next speed detection signal f' after the waveform disturbances α. β are overlooked by switching the frequencies of the clock signal 10 shown in FIG. 8 or otherwise switching the number of counts in the counters C1. C2 shown in FIG. 9. Therefore, the aforementioned effect becomes achievable even though the rated number of revolutions is changed.

Figure 10:
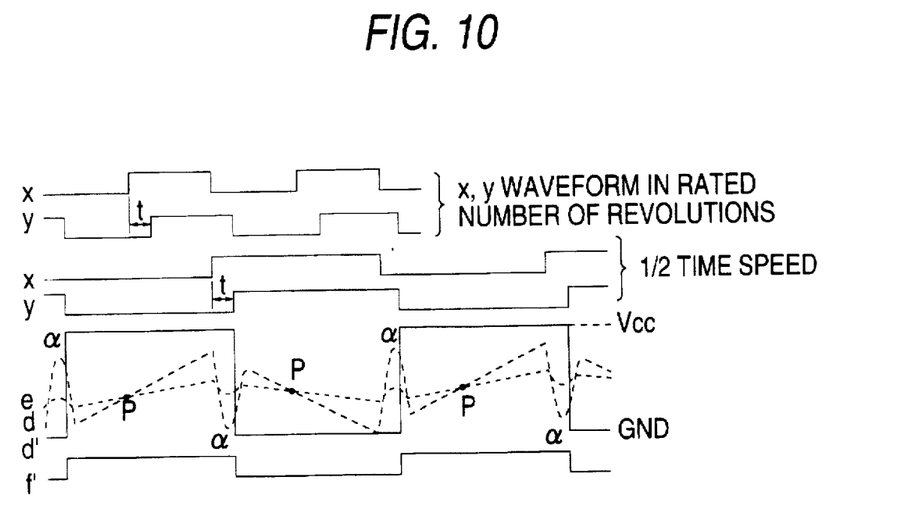
FIG. 10 is a timing chart explanatory of the operation of the circuit in the brushless motor speed detection device at half the speed of the rated number of revolutions.

In this case, the delay time t of the first delay signal y with respect to the position signal x is set at a predetermined value independently of the number of revolutions of the motor. In other words, the full offset cancel timing is quickened when the number of revolutions is small (e.g.. half the speed of the rated number of revolutions) and as shown in FIG. 10. the full offset is canceled within the waveform disturbance α due to the switching of energizing the driving coils Lu. Lv. Lw.

When the first delay signal y is turned to the' Hi level (high level) in FIG. 10. the full offset on the supply voltage Vcc side is canceled and the output voltage d' of the offset circuit 8 is instantaneously shifted to the induced electromotive voltage d. At this time, the speed detection signal f' is turned to the Lo level (low level) on condition that the coil neutral point voltage e>the induced electromotive voltage d due to the waveform disturbance α has been established.

Since the second inverted delay signal ȳ is turned to the Lo level (low level) then. the full offset on the GND side is applied and the induced electromotive voltage d is returned to the output voltage d' again before being lowered up to the GND level.

When the first delay signal y and the second inverted delay signal ȳ are turned to the Lo and Hi levels (high level), respectively, the full offset on the GND side is canceled and the output voltage d' is instantaneously shifted to the induced electromotive voltage d. At this time. the speed detection signal f' is turned to the Hi level (high level) when the coil neutral point voltage e<the induced electromotive voltage d becomes established because of the disturbance α.

Then the full offset on the supply voltage Vcc side is applied at this moment likewise and the induced electromotive voltage d is returned to the output voltage d' again before being lowered up to the Vcc level.

Thus the speed detection signal f' at the time the number of revolutions is considerably less than the rated number of revolutions like half the speed of the rated number of revolutions. for example. becomes automatically synchronous with the full offset cancel signal y and the inverted full offset cancel signal y.

As the signal y and the inverted signal ȳ are formed on the basis of the position signal x whose Hi. Lo are switched at the zero cross points of the output signals u. v. w of the Hall elements Hu. Hv. Hw. the timing variation tends to grow greater because of error factors including the positional deviation of the Hall elements Hu. Hv. Hw. an unbalanced voltage and so forth. In consequence, the detection accuracy of the speed detection signal f' is lowered.

However, it is only within a limited range before and after the rated number of revolutions that the detection accuracy of the speed detection signal f' is sought and as far as the speed detection signal f' of FIG. 10 remains at the level at which the motor speed control circuit is able to output a motor accelerating signal continuously, such the accuracy would practically pose no problem even if it is rough.

According to this embodiment of the invention, the detection accuracy is thus set rough to the extent that it practically constitutes no obstacle at the level at which the motor speed control circuit is allowed to output the motor accelerating signal continuously with the signals (the position signal y. inverted position signal ȳ) formed on the basis of the output signals u. v. w of the Hall elements Hu. Hv. Hw as those automatically usable even when the number of revolutions of the brushless motor deviates from the rated number of revolutions by predetermined numbers as in the case of a transition period, for example, during which the rated number of revolutions is not reached. Therefore, stable speed control can be exerted even when the number of revolutions of the brushless motor deviates from the rated number of revolutions by predetermined numbers, so that the aforementioned effect is enhanced further.

Figure 11:
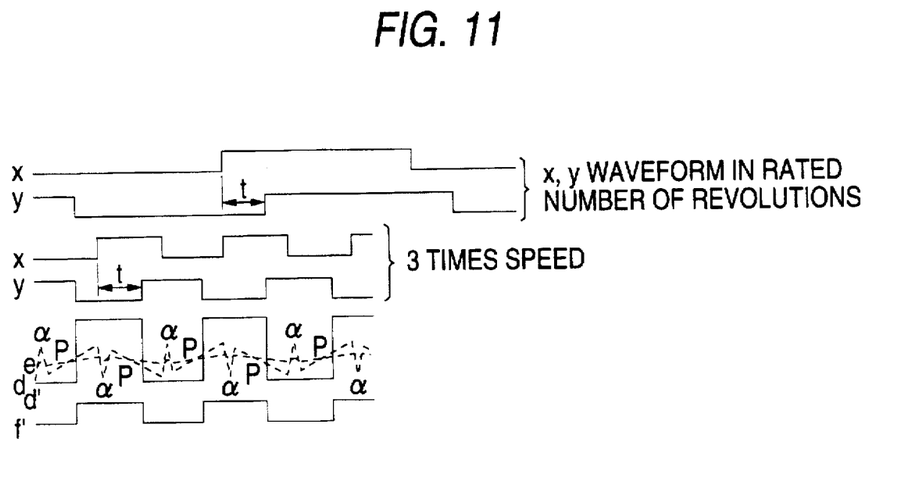
FIG. 11 is a timing chart explanatory of the operation of the circuit in the brushless motor speed detection device at a speed three times greater than the rated number of revolutions.

FIG. 11 is a timing chart explanatory of circuit operation in the brushless motor speed detection device at a speed three times greater than the rated number of revolutions. Since the delay time t is constant at the speed three times greater than the rated number of revolutions, the full offset cancel timing is slowed and as shown in FIG. 11, the full offset is canceled after the induced electromotive voltage detection timing P.

In other words, the coil neutral point voltage e>the induced electromotive voltage d when the full offset on the supply voltage Vcc side is canceled and since the coil neutral point voltage e<the induced electromotive voltage d when the full offset on the GND side is canceled, the speed detection signal f becomes automatically synchronous with the full offset cancel signal y and the inverted full offset cancel signal $\bar{y}$ like the case described in reference to FIG. 10.

According to this embodiment of the invention, the detection accuracy is thus set rough to the extent that it practically constitutes no obstacle at the level at which the motor speed control circuit is allowed to output the motor accelerating signal continuously with the signals (the position signal y, inverted position signal $\bar{y}$) formed on the basis of the output signals u, v, w of the Hall elements Hu, Hv, Hw as those automatically usable even when the number of revolutions of the brushless motor deviates from the rated number of revolutions by predetermined numbers as in the case of excessive revolutions, for example, an overshoot. Therefore, stable speed control can be exerted even when the number of revolutions of the brushless motor deviates from the rated number of revolutions by predetermined numbers, so that the aforementioned effect is enhanced further.

Although a description has been given of the present invention by reference to the embodiments of the invention made by present inventors, the invention is not limited to the aforesaid embodiments thereof but may be modified in various manners without departing the scope and sprite thereof.

As set forth above, a highly accurate speed detection signal is obtainable by preventing the occurrence of such a mispulse as is caused by the switching of energizing the driving coils, the speed error correction and the like. Thus excellent speed control can be exerted over a motor.

What is claimed is:

1. A brushless motor speed detection device comprising:
   a stator having a three-phase driving coil reciprocally energized in positive and negative directions;
   a rotor having magnetic poles;
   position detecting means for obtaining a three-phase output signal corresponding to rotation of the rotor;
   a driving circuit for controlling energization of the driving coil according to an output signal from the position detecting means;
   a first synthesizing circuit for obtaining an induced electromotive voltage in accordance with a voltage waveform produced at the driving coil end;
   a second synthesizing circuit for obtaining a position signal by synthesizing output signals of the position detecting means;
   coil neutral point voltage detecting means for detecting a neutral point voltage of the three-phase driving coil;
   a delay circuit for synthesizing a delay signal whose phase rises later than a rising or falling timing of the position signal;
   an offset circuit for applying an offset to the induced electromotive voltage while comparing the induced electromotive voltage and the coil neutral point voltage, and canceling the offset according to the delay signal from the delay circuit; and
   a comparator for comparing the induced electromotive voltage connected to the output of the offset circuit with the coil neutral point voltage in order to generate a speed detection signal.

2. A brushless motor speed detection device as claimed in claim 1, wherein the delay circuit generates a first delay signal rising at a time which is delayed by a predetermined time from the rising of the position signal, and a second delay signal rising at a time which is delayed by a predetermined time from the falling of the position signal and wherein the offset circuit applies the offset to raise the induced electromotive voltage up to a vicinity of a supply voltage when the induced electromotive voltage becomes higher than the coil neutral point voltage and cancels the offset according to the first delay signal, and wherein the offset circuit applies the offset to lower the induced electromotive voltage down to a vicinity of a ground potential when the induced electromotive voltage becomes lower than the coil neutral point voltage and cancels the offset according to the second delay signal.

3. A brushless motor speed detection device as claimed in claim 1, wherein the delay circuit generates a first delay signal rising at a time which is delayed by a predetermined time from the rising of the position signal and falling at timing which is delayed by a predetermined time from the falling of the position signal, and a second delay signal as an inverted signal of the first delay signal.

4. A brushless motor speed detection device as claimed in claim 1, wherein the delay circuit generates a first delay signal rising at a time which is delayed by a predetermined time from the rising of the position signal and falling simultaneously with the falling of the position signal, and a second delay signal rising at a time which is delayed by a predetermined time from the falling of the position signal and falling simultaneously with the rising of the position signal.

5. A brushless motor speed detection device as claimed in claim 1, wherein the first synthesizing circuit is provided with two-input diode OR circuits connected to the phase-to-phase output terminals of the driving coils, and a three-input diode OR circuit connected to each output terminal of the two-input diode OR circuit and inversely connected to the diodes of the two-input diode OR circuits.

6. A brushless motor speed detection device as claimed in claim 1, including delay time variable means for varying a delay time between the position signal and the delay signal in accordance with a switching of a rated number of revolutions of the brushless motor.

7. A brushless motor speed detection device as claimed in claim 1, wherein when a number of revolutions of the brushless motor deviates from a rated number of revolutions by a predetermined number, the output signal of the position detecting means is utilized as a further speed detection signal.

* * * * *